Patented Oct. 31, 1933

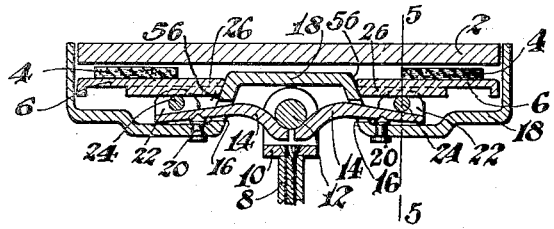

1,932,894

UNITED STATES PATENT OFFICE 1,932,894

BRAKE

George F. Houston, South Bend, Ind., assignor to Bendix Brake Company, South Bend, Ind., a corporation of Illinois Application March 30, 1929. Serial No. 351,142

14 Claims. (Cl. 188—72)

This invention relates to brakes, and is illustrated as embodied in a novel automobile brake of the disk type. An object of the invention is to arrange for the use of novel and simple connections, by mounting the non-rotating disk to swing on a pivot toward and from the rotating disk in applying and releasing the brake.

Various features of novelty relate to the mounting of the disk and to its structure and the structure of the housing or backing plate permitting this mounting, and to the simplified operating means, and to other novel combinations of parts and desirable details of construction which will be apparent from the following description of one illustrative embodiment shown in the accompanying drawing, in which:

Figure 1 is an elevation of the brake, with the rotating disk removed;

Figure 2 is a vertical section through the brake, on the line 2—2 of Figure 1, but including the rotating disk;

Figure 3 is a horizontal section through the brake, on the line 3—3 of Figure 1, showing the applying means;

Figure 4 is a horizontal section through the brake, on the line 4—4 of Figure 1, showing the brake; and Figure 5 is a section through the brake on lines 5—5 of Figures 1 and 3 showing the roller, operating lever and ribs of the brake.

The illustrated brake includes a rotatable friction member or disk 2, adapted to be secured in any desired manner to a vehicle wheel. The non-rotatable member of the brake is shown as a disk 6 faced with brake lining or the like 4, the disk being a pair of steel stampings or sections spaced apart at the top to provide clearance for the applying means.

The novel non-rotatable and pivotally mounted disk 6 is operated by a cable or the like 8 having a yoke fitting 10 with a roller 12 engaging the adjacent ends of levers 14 passing through openings 16 in a backing plate or housing 18, the backing plate being offset into the space between the sections at the top of disk 6, as shown in Figure 3, to permit the described mounting of the levers. Levers 14 are shown fulcrumed on pointed pivot pins 20 carried by the backing plate, and at their opposite ends are provided with rollers 24, carried by yoke ends 22, and engaging ribs 26 on the disk 6.

The lower ends of the disk sections 6 overlap as shown in Figure 4, and are connected by fastenings 30 and 32 to a reinforcing plate 34, the fastening 30 passing through an enlarged opening 36 in the left disk section and the fastening 32 through an enlarged opening 38 in the other section, so that the sections may be adjusted with respect to each other for a purpose hereinafter described. The lower portion of the backing plate 18 is offset rearwardly to form a space 40 housing a horizontal transverse pivot 42 carried by a yoke 44 and passing through a bearing block 45 welded or otherwise secured to the reinforcing plate 34. Yoke 44 passes through openings 46 in the backing plate, which is thickened at this point by a plate 48 welded thereto and formed with a threaded socket for an adjusting screw 50 secured to the yoke by nuts 52. Turning screw 50 adjusts the fulcrum pivot 42 toward or from disk 2 to compensate for wear.

In order to produce servo-brake operating characteristics, the offset in the backing plate 18, housing the levers 14, is sloped as at 56. Since each of the disc sections 6 is pivoted on one or the other of the fastenings 30 or 32, and is freely adjustable about the other as a result of the slotted or enlarged openings 36 or 38, it is readily apparent that rotation of the rotary brake disc while the friction lining of the non-rotating brake discs is in engagement therewith will tend to swing the free end of one disc or the other, depending upon the direction of rotation, about its fastening 30 or 32 in a plane parallel with the rotary disc and against one of the slopes 56, which as a result thereof tends to increase the braking pressure of one of the discs.

In operation, tension on cable 8 operates the levers 14 to swing the disk sections 6 against the resistance of suitable springs toward the rotating disk 2. Sections 6 are preferably yieldingly connected by a tensioned coil spring 54.

While one illustrative embodiment has been described in detail, it is not my intention to limit the scope of the invention to that particular embodiment or otherwise than by the terms of the appended claims.

I claim:

1. A brake having a pivoted disk, and comprising, in combination therewith, a pair of independent levers acting on opposite portions of said disk and having their operating ends adjacent each other, and a tension element acting on said ends to swing the disc and apply the brake.

2. A brake having a movable disk, and comprising, in combination therewith, a pair of independent levers arranged to move in the same plane acting on opposite portions of said disk and having their operating ends adjacent each other, and means acting on said ends to apply the brake.

3. A brake comprising a stationary backing plate, a pair of independent operating levers thereon with adjacent ends, and a tension element engaging said ends in common.

4. A brake having a pair of independent operating levers with adjacent juxtaposed ends, and a single common operating means engaging said ends.

5. A brake having a pair of separate yieldingly-connected semi-circular sections jointly forming a friction disk.

6. A disc brake having a pair of flat overlapping and adjustably-connected sections forming a friction disk.

7. A disc brake having a pair of flat overlapping sections forming a friction disk.

8. A vehicle brake having a friction disk, a backing plate housing said disk and formed with an offset portion, and a pivot for said disk arranged in the space provided by said offset portion.

9. A brake comprising a single pivoted bracket, a pair of adjustably connected friction elements supported on the bracket and means for actuating the friction elements including a pair of levers and a single means for applying force to the levers.

10. A brake comprising a support, a bracket pivoted on the support, a friction element supported by the bracket having separable ends, corresponding levers cooperating with the respective ends and a single means for actuating the levers.

11. A brake comprising a support, a bracket adjustably positioned on the support, a member pivoted to the bracket, friction elements adjustably supported by the member and having separable ends, corresponding levers arranged in oppositely disposed relation adaptable for cooperation with the separable ends of the friction elements and a single means for actuating the levers.

12. A disc servo-brake comprising, a support, a rotary brake disc, an arcuate disc brake shoe, a pivotal mounting on said support for one end of said brake shoe permitting swinging movement of said shoe towards said rotary brake disc for frictional engagement therewith and in a plane parallel thereto, and means on said support substantially diametrically opposite said mounting for engaging the other end of said shoe, said means tending to produce additional braking pressure upon rotation of said rotary brake disc in a direction from said shoe mounting toward said shoe.

13. A disc servo-brake comprising, a support, a rotary brake disc, an arcuate disc brake shoe, a pivotal mounting on said support for one end of said brake shoe permitting swinging movement of said shoe towards said brake plate for frictional engagement therewith and in a plane parallel thereto, and means on said support approximately diametrically opposite said mounting for engaging a complementary means on said shoe, said first-named means and complementary means tending to produce additional braking pressure upon rotation of said rotary brake disc in a direction from said shoe mounting toward said shoe.

14. A disc brake comprising a rotary brake disc, a stationary support, a disc brake shoe movably mounted upon said support for engagement with said rotary brake plate, and means on said brake shoe and said support tending to increase the engagement pressure of said brake shoe upon said rotary brake disc during rotation of said brake disc and engagement of said brake shoe therewith.

GEORGE F. HOUSTON.